US010378088B2

(12) United States Patent
Yoshino et al.

(10) Patent No.: US 10,378,088 B2
(45) Date of Patent: Aug. 13, 2019

(54) ALUMINUM ALLOY FIN MATERIAL AND HEAT EXCHANGER

(71) Applicant: MITSUBISHI ALUMINUM CO., LTD., Minato-ku, Tokyo (JP)

(72) Inventors: Michihide Yoshino, Shizuoka (JP); Masakazu Edo, Shizuoka (JP)

(73) Assignee: MITSUBISHI ALUMINUM CO., LTD., Tokyo (JP)

( * ) Notice: Subject to any disclaimer, the term of this patent is extended or adjusted under 35 U.S.C. 154(b) by 210 days.

(21) Appl. No.: 15/541,648

(22) PCT Filed: Dec. 14, 2015

(86) PCT No.: PCT/JP2015/084946

§ 371 (c)(1),
(2) Date: Jul. 5, 2017

(87) PCT Pub. No.: WO2016/129175

PCT Pub. Date: Aug. 18, 2016

(65) Prior Publication Data

US 2017/0349980 A1 Dec. 7, 2017

(30) Foreign Application Priority Data

Feb. 10, 2015 (JP) ................................ 2015-024545

(51) Int. Cl.
*C22C 21/02* (2006.01)
*C22C 21/10* (2006.01)
(Continued)

(52) U.S. Cl.
CPC .............. *C22C 21/10* (2013.01); *C22C 21/00* (2013.01); *F28F 1/126* (2013.01); *F28F 21/084* (2013.01);
(Continued)

(58) Field of Classification Search
CPC ......... C22C 21/00; C22C 21/10; C22C 21/02; F28F 1/126; F28F 21/084; F28D 1/05366; B23K 1/0012; C22F 1/053; C22F 1/043
(Continued)

(56) References Cited

U.S. PATENT DOCUMENTS 5,744,255 A * 4/1998 Doko .................. B23K 35/286 165/134.1
8,663,817 B2 * 3/2014 Henry ................ B23K 35/0238 165/177
(Continued)

FOREIGN PATENT DOCUMENTS

CN 101501230 A 8/2009
CN 103502768 A 1/2014
(Continued)

OTHER PUBLICATIONS

English translation of the International Preliminary Report on Patentability dated Aug. 24, 2017 issued in counterpart International Application No. PCT/JP2015/084946.
(Continued)

*Primary Examiner* — Patricia L. Hailey
(74) *Attorney, Agent, or Firm* — Holtz, Holtz & Volek PC

(57) ABSTRACT

[Problem]
There is provided an aluminum alloy fin material with high strength, superior brazability and superior corrosion resistance.
[Solving means]
An aluminum alloy fin material has a composition, in % by mass, of the following: Zr: 0.05 to 0.25%, Mn: 1.3 to 1.8%, Si: 0.7 to 1.3%, Fe: 0.10 to 0.35%, and Zn: 1.2 to 3.0%, the remainder being Al and inevitable impurities. The aluminum alloy fin material has a solidus temperature of 615° C. or higher, a tensile strength after brazing of 135 MPa or higher, a pitting potential after brazing in the range of −900 to −780 mV, and an average crystal grain diameter in a rolled surface after brazing in the range of 200 μm to 1,000 μm.

9 Claims, 1 Drawing Sheet

(51) Int. Cl.

| | |
|---|---|
| ***C22C 21/00*** | (2006.01) |
| ***F28F 21/08*** | (2006.01) |
| ***F28F 1/12*** | (2006.01) |
| *C22F 1/053* | (2006.01) |
| *B23K 1/00* | (2006.01) |
| *F28D 1/053* | (2006.01) |

(52) U.S. Cl.
CPC ............ *B23K 1/0012* (2013.01); *C22F 1/053* (2013.01); *F28D 1/05366* (2013.01)

(58) Field of Classification Search
USPC .................................................. 420/540, 548
See application file for complete search history.

(56) References Cited

U.S. PATENT DOCUMENTS 9,433,996 B2 9/2016 Wintersteen et al.
2003/0082068 A1* 5/2003 Wittebrood ........... B32B 15/016 420/540
2005/0095167 A1* 5/2005 Barth ...................... C22C 21/02 420/544
2009/0308500 A1 12/2009 Suzuki et al.
2010/0291400 A1* 11/2010 Ahl .................... B23K 35/0233 428/576
2011/0014494 A1* 1/2011 Matsumoto .......... B23K 1/0012 428/654
2012/0070681 A1* 3/2012 Norgren .................. C22C 21/10 428/553
2013/0244051 A1* 9/2013 Matsumoto ........ B23K 35/0238 428/576
2014/0033534 A1 2/2014 Wintersteen et al.
2014/0360712 A1* 12/2014 Fujita ........................ C22F 1/00 165/185
2015/0050520 A1* 2/2015 Niikura ................... C22C 21/00 428/654
2015/0252461 A1 9/2015 Kokubo et al.
2016/0040947 A1* 2/2016 Gatenby ................ B22D 21/04 165/185
2016/0089860 A1* 3/2016 Kurosaki ................ C22C 21/02 428/654
2017/0003085 A1* 1/2017 Fukumoto ............ B22D 21/007

FOREIGN PATENT DOCUMENTS

| | | | |
|---|---|---|---|
| CN | 104583433 | A | 4/2015 |
| EP | 2048252 | A1 | 4/2009 |
| JP | 01247542 | A | 10/1989 |
| JP | 05305307 | A | 11/1993 |
| JP | 07018358 | A | 1/1995 |
| JP | 08291377 | A | 11/1996 |
| JP | 09031614 | A | 2/1997 |
| JP | 11256261 | A | 9/1999 |
| JP | 2002161323 | A | 6/2002 |
| JP | 2008038166 | A | 2/2008 |
| JP | 2008308761 | A | 12/2008 |
| JP | 2012126950 | A | 7/2012 |
| JP | 2014047384 | A | 3/2014 |
| WO | 2008015846 | A1 | 2/2008 |
| WO | 2014034212 | A1 | 3/2014 |

OTHER PUBLICATIONS

International Search Report (ISR) and Written Opinion dated Mar. 8, 2016 issued in International Application No. PCT/JP2015/084946.

* cited by examiner

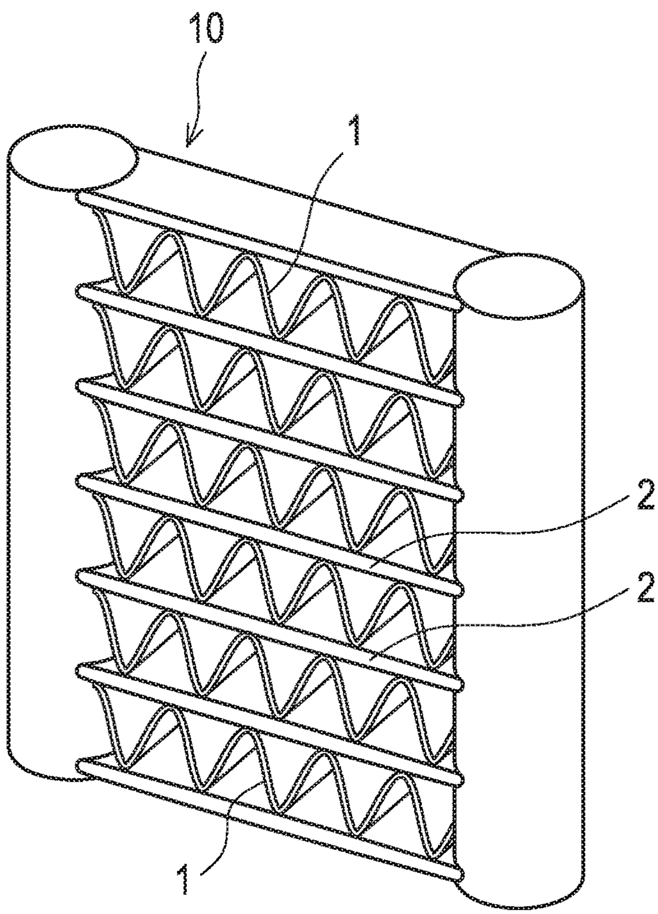
10
1
2
2
1

ALUMINUM ALLOY FIN MATERIAL AND HEAT EXCHANGER

CROSS-REFERENCE TO RELATED APPLICATIONS

The present application is a U.S. National Stage Application filed under 35 U.S.C. 371 of International Application No. PCT/JP2015/084946, filed Dec. 14, 2015, and claims priority of Japanese Patent Application No. 2015-024545, filed Feb. 10, 2015, both of which are incorporated herein by reference in their entirety.

TECHNICAL FIELD

The present invention relates to an aluminum alloy fin material to be suitably used in a heat exchanger.

BACKGROUND ART

Heat exchangers have a tendency to be reduced in weight from the viewpoint of fuel economy improvement and space saving, and hence, on members thereof to be used, wall-thickness reduction and strength enhancement are demanded. The requirement is high particularly on fin materials because of the large use amount thereof. Some proposals have been thus made so far on aluminum alloy fin materials having regulated amounts of components added (for example, see Patent Literatures 1 to 6).

CITATION LIST

Patent Literature

Patent Literature 1: Japanese Patent Laid-Open No. 2002-161323

Patent Literature 2: Japanese Patent Laid-Open No. 9-31614

Patent Literature 3: Japanese Patent Laid-Open No. 8-291377

Patent Literature 4: Japanese Patent Laid-Open No. 7-18358

Patent Literature 5: Japanese Patent Laid-Open No. 2012-126950

Patent Literature 6: Japanese Patent Laid-Open No. 2008-308761

SUMMARY OF INVENTION

Problems to be Solved by the Invention

However, even if the strength enhancement can be achieved by simply increasing the amounts of components added, buckling of fins is caused by erosion during brazing due to the decrease in the melting point (solidus temperature). There hence arise problems on production, including that a brazing production line dedicated to thin-wall heat exchangers is needed, and that the production condition is restricted to a narrow range. Further, in thin-wall high-strength fins, there becomes large the consumption thereof by corrosion in the early period in the corrosive environment in use of the heat exchangers, and there arises also a problem that the maintenance of the performance becomes difficult after the long-period use.

The present invention has been achieved in consideration of the above situation and has an object to provide an aluminum alloy fin material with high strength, superior brazability and superior corrosion resistance.

Means to Solve a Problem

Then, in the present invention, use of a suitable component in a fin material, as well as use of a fin material having a certain or higher melting point (solidus temperature) and a coarse crystal grain diameter during brazing, which are both to improve its resistance to erosion during brazing, provide a fin with high strength and superior brazability. Specifically, this is achieved by adding to the fin material Zr and controlling the distribution state of fine second-phase particles. Further with respect to the corrosion resistance, controlling the composition of coarse second-phase particles after brazing improves the corrosion resistance.

More specifically, in first aspect of the present invention, the inventive aluminum alloy fin material has a composition, in % by mass, of the following: Zr: 0.05 to 0.25%, Mn: 1.3 to 1.8%, Si: 0.7 to 1.3%, Fe: 0.10 to 0.35%, and Zn: 1.2 to 3.0%, the remainder being Al and inevitable impurities, and wherein the solidus temperature is 615° C. or higher; the tensile strength after brazing is 135 MPa or higher; the pitting potential after brazing is in the range of −900 to −780 mV; and the average crystal grain diameter in the rolled surface after brazing is in the range of 200 μm to 1,000 μm.

In a second aspect of the present invention, the aluminum alloy fin material further contains, in % by mass, Cu: 0.03 to 0.10% as compositional component in the aluminum alloy fin material according to the first aspect of the present invention.

In a third aspect of the present invention, the aluminum alloy fin material is according to the first or second aspect of the present invention, wherein among second-phase particles distributed in the matrix after brazing, the averages of the contents of Mn, Fe and Si in an Al—Mn—Fe—Si compound 0.5 μm or larger in circle-equivalent diameter satisfy a relation of $Fe/(Mn+Si)<0.25$ by atomic % of the compound.

In a fourth aspect of the present invention, the aluminum alloy fin material is according to any one of the first to third aspects of the present invention, wherein in the raw material before working, second-phase particles distributed in the matrix in the range of 0.05 to 0.4 μm in circle-equivalent diameter are present in the range of 20 to 80 particles/$\mu m^2$.

Hereinafter, the reason for defining the present invention will be described. Here, any of component contents in a composition is indicated in % by mass.

Zr: 0.05 to 0.25%

Zr is incorporated in order to make the crystal grain diameter of a fin after brazing to be coarse and to improve the strength of the fin after brazing. When the content of Zr is lower than 0.05%, however, there cannot be attained the effect of making the crystal grain diameter of the fin after brazing to be coarse and the effect of improving the strength. On the other hand, when Zr is incorporated in more than 0.25%, giant compounds easily form and the productivity of an aluminum alloy plate remarkably decreases. For these reasons, the content of Zr is established at 0.05 to 0.25%.

Mn: 1.3 to 1.8%

Mn forms an Al—Mn—Si-based or Al—(Mn, Fe)—Si-based intermetallic compound (dispersed particles) with Si, Fe and the like and thereby has the effect of improving the strength of the fin after brazing. When the content is lower than 1.3%, the effect is not sufficiently exhibited; and when being higher than 1.8%, giant compounds of the Al—(Mn, Fe)—Si-based intermetallic compound are formed and the productivity of an aluminum alloy plate remarkably decreases. Hence, the Mn content is established at 1.3% to 1.8%. Here, for the same reason, it is desirable that the lower limit be 1.5% and the upper limit be 1.75%.

Si: 0.7 to 1.3%

Si is incorporated in order to deposit an Al—Mn—Si-based or Al—(Mn, Fe)—Si-based intermetallic compound (dispersed particles) and provide the strength after brazing by dispersion strengthening. When the content is lower than 0.7%, however, there is a small effect of the dispersion strengthening by the Al—Mn—Si-based or Al—(Mn, Fe)—Si-based intermetallic compound, and a desired strength after brazing cannot be obtained. On the other hand, when the content is higher than 1.3%, the amount of Si solubility becomes large and the solidus temperature (melting point) decreases and remarkable erosion during brazing becomes liable to be caused. Here, for the same reason, it is desirable that the lower limit be 0.9% and the upper limit be 1.2%.

Fe: 0.10 to 0.35%

The incorporation of Fe provides the dispersion strengthening by an Al—(Mn, Fe)—Si-based compound and the strength after brazing is improved. Hence, the content of Fe is made to be 0.10% or higher. Further when the content of Fe is higher than 0.35%, a constituent particles (intermetallic compound) coarsened during the casting time becomes a starting point of corrosion and there thereby arises a risk that the resistance to the self-corrosion of the fin material decreases.

Cu: 0.03 to 0.10%

Cu is incorporated as desired since it improves the strength after brazing by solid-solution strengthening. However, when the content is lower than 0.03%, the effect cannot sufficiently be attained. Further when 0.10% or more thereof is incorporated, since the potential is made noble and the sacrificial anode effect of the fin material on a tube material is lowered, in the case where Cu is incorporated as desired, the Cu content is made to be 0.03 to 0.10%. However, Cu may be contained in less than 0.03% as an inevitable impurity.

Zn: 1.2 to 3.0%

Zn is incorporated in order to provide the sacrificial anode effect by making the potential less noble. When the Zn content is lower than 1.2%, the sacrificial anode effect cannot sufficiently be attained. On the other hand, when more than 3.0% thereof is incorporated, the potential becomes too less noble and there arises a risk that the resistance to the self-corrosion of the fin material as a simple body decreases.

Solidus Temperature: 615° C. or Higher

By making the solidus temperature to be 615° C. or higher, erosion during brazing is prevented and the buckling is thus prevented. Here, for the same reason, it is desirable that the solidus temperature be 617° C. or higher. The solidus temperature can be attained by establishment of components.

Tensile Strength After Brazing: 135 MPa or Higher

It is required that to insure the strength of the fin material as used in a heat exchanger, its tensile strength after brazing be 135 MPa or higher.

Pitting Potential After Brazing: −900 to −780 mV

By establishing the pitting potential after brazing, a good sacrificial anode effect is attained. Hence, the pitting potential after brazing is made to be −780 mV or lower. At a pitting potential nobler than this potential, the sacrificial anode effect becomes insufficient and the corrosion is liable to be generated on the tube. On the other hand, since when the pitting potential becomes less noble than −900 mV, the resistance to the self-corrosion of the fin decreases, the pitting potential is made to be −900 mV or higher.

Average Crystal Grain Diameter in the Rolled Surface After Brazing: 200 μm to 1,000 μm Since the erosion is generated preferentially on crystal grain boundaries, a finer crystal grain diameter, which increases the number (area) of the crystal grain boundaries, facilitates the erosion of the fin material. The strength after brazing, when the crystal grain diameter after brazing becomes too coarse, lowers. That is, when the average crystal grain diameter in the rolled surface after brazing is smaller than 200 μm, the resistance to the erosion decreases; and when being larger than 1,000 μm, a reduction of the strength after brazing is brought about.

The material in question, when being brazed, recrystallizes in its temperature-rise process (temperatures lower than the temperature at which a brazing filler metal melts). After the recrystallization, the size of the crystal grains makes almost no change. Therefore, since the size of the recrystallized particles having been formed during the erosion time by the brazing filler metal becomes equal to the size of the recrystallized particles after brazing, the crystal grain diameter can be observed by using the grain diameter after brazing.

The averages of the contents of Mn, Fe and Si in the Al—Mn—Fe—Si compound 0.5 μm or larger in circle-equivalent diameter satisfy, by atomic % (of the compound), Fe/(Mn+Si)<0.25.

The corrosion of an Al alloy is promoted by a compound containing Fe. By contrast, a compound containing no Fe can hardly promote the corrosion. Therefore, that the Fe/(Mn+Si) ratio in the compound is low means that the compound hardly promoting corrosion is formed. Although when the compound is present, the corrosion of the Al alloy is promoted, however, the effect is small in the fine compound. The size to become its indication is 0.5 μm or larger.

Therefore, when there is satisfied the above ratio in the Al—Mn—Fe—Si compound 0.5 μm or larger in circle-equivalent diameter, the compound can reduce the effect of promoting the corrosion of the Al compound.

It is more desirable that the above ratio be 0.22 or lower. Further, for the same reason, it is still more desirable that the above ratio be 0.13 or higher.

The above ratio can be attained by focusing attention on material components for production, casting rate in production, the homogenizing treatment condition, and the like.

20 to 80 particles/μm$^2$ of second-phase particles in the range of 0.05 to 0.4 μm in circle-equivalent diameter in the raw material before working.

The second-phase particle affects the recrystallization behavior of the material. The fine compound (0.5 μm or smaller) retards the recrystallization and makes the crystal grains after recrystallization to be coarse. By contrast, the coarse compound promotes the recrystallization and makes the crystal grains after recrystallization to be fine. Therefore, in the case where a size range of the compound of 0.05 to 0.4 μm is at a high rate in the raw material before brazing, the recrystallization during the brazing heat treatment is retarded and the crystal grains after the brazing heat treatment become large. When the second-phase particles are dispersed in a suitable amount, since the crystal grains become large and the resistance to the erosion increases, it becomes difficult for the buckling to occur in brazing.

If the number of such particles exceeds 80 particles/μm$^2$, however, it becomes difficult for the material to be softened in continued cold rolling during production or annealing for refining, causing interference with the production. It is more desirable that the dispersed amount be 30 particles/μm$^2$ or larger, and for the same reason, 50 particles/μm$^2$ or smaller is more desirable.

The dispersion of the second-phase particles can be attained by carrying out the homogenizing treatment under the condition of a low temperature and a long time, for example, 350 to 480° C.×2 to 15 hours.

Effects of Invention

As interpreted hitherto, according to the present invention, there can be attained the effect of having a high strength, hardly causing the buckling and the erosion during brazing, and exhibiting good brazability, and providing a good resistance to corrosion after brazing.

BRIEF DESCRIPTION OF DRAWING

FIG. 1 is a perspective view illustrating a use example of an aluminum alloy fin material according to one embodiment of the present invention.

DESCRIPTION OF EMBODIMENTS

Hereinafter, embodiments of the present invention will be described.

An ingot regulated to compositional components of the present invention can be produced by a conventional method. It is desirable that the casting rate during the casting time be made to be 0.2 to 10° C./s. Thereby, the Fe/(Mn+Si) can be controlled low by regulating the component ratio in an Al—Mn—Fe—Si compound 0.5 μm or larger in circle-equivalent diameter.

It is desirable that the ingot is homogenized suitably under the condition of 350 to 480° C.×2 to 15 hours. Thereby, there can be regulated the Fe/(Mn+Si) ratio in the Al—Mn—Fe—Si compound 0.5 μm or larger in circle-equivalent diameter. There can further be provided a raw material in which second-phase particles in the range of 0.05 to 0.4 μm in circle-equivalent diameter are dispersed in 20 to 80 particles/μm$^2$.

The raw material can be subjected to hot working and cold working by conventional methods. The conditions can be ones according to the conventional methods.

The above material, as illustrated in FIG. 1, is provided as aluminum alloy fin materials 1, which are assembled with tubes 2 and headers, and are supplied to brazing as a body to be brazed. The conditions of the brazing are not especially limited in the present invention, but may include, for example, a temperature-rise rate of 40° C./min in average starting from room temperature, a holding temperature of 600° C., a holding time of 3 min, a cooling rate of 100° C./min, and the like. A heat exchanger 10 is provided by the brazing.

The brazed aluminum alloy fin material has a tensile strength after the brazing of 135 MPa or higher, a pitting potential after the brazing in the range of −900 to −780 mV, and further an average crystal grain diameter in the rolled surface after the brazing in the range of 200 μm to 1,000 μm. The brazed aluminum alloy fin material is superior in strength and corrosion resistance.

EXAMPLE 1

Hereinafter, the present invention will be described by comparing Examples and Comparative Examples.

An aluminum alloy having a composition (Al and inevitable impurities as the remainder) indicated in Table 1 was melted and cast by a semi-continuous casting method. Here, the casting rate was 0.6 to 2.5° C./s. A homogenizing treatment was further carried out under the condition indicated in Table 2 on the obtained ingot, and thereafter, hot rolling and cold rolling were carried out.

In the cold rolling step, the resultant was subjected to a cold rolling of 75% or more, thereafter subjected to an intermediate annealing at 350° C., and thereafter subjected to a final rolling of 40% in rolling ratio to thereby obtain a fin material (test material) of 0.06 mm in plate thickness and H14 in quality.

The resultant was subjected to brazing-equivalent heating under the heat treatment condition of heating up from room temperature to 600° C. at an average temperature-rise rate of 40° C./min, holding the temperature at 600° C. for 3 min, and then cooling at a temperature-fall rate of 100° C./min. For the fin material after the heating, the following evaluation tests were carried out. The results of the respective tests are shown in Table 2.

(Distribution State of the Compound in the Raw Material)

For the raw material after the homogenizing treatment, the density of the number of particles (particles/μm$^2$) of the second-phase particles (dispersed particles) in the range of 0.05 to 0.4 μm in circle-equivalent diameter was measured by a transmission electron microscope (TEM).

The measurement method involved subjecting the raw material to a salt bath annealing of 400° C.×15 s to remove the deformed strain and make it easy for the compound to be observed, thereafter preparing a thin film by mechanical polishing and electrolytic polishing by conventional methods, and taking photographs thereof in 30,000× by a transmission electron microscope. The photographs were taken for 5 visual fields (about 16 μm$^2$ in total), and the size and the density of the number of the dispersed particles were measured by using image analysis.

(Strength After Brazing)

The prepared fin material was subjected to a brazing-equivalent heat treatment. The heat treatment specifically involved heating up to 600° C. at an average temperature-rise rate of 40° C./min, holding the temperature at 600° C. for 3 min, and then cooling at a temperature-fall rate of 100° C./min. Thereafter, a sample was cut out parallel to the rolling direction to thereby prepare a test piece of JIS No. 13 shape-B, which was subjected to a tensile test to measure the tensile strength. The tensile rate was made to be 3 mm/min. The evaluation criteria were according to Table 2. The results are shown as TS after brazing.

(Pitting Potential)

The pitting potential after brazing was measured by an anodic polarization measurement.

The fin material was subjected to a brazing-equivalent heat treatment. The condition of the heat treatment was the same method as in (Strength after brazing). A sample for the polarization measurement was cut out from the fin material after the brazing-equivalent heat treatment, immersed in a 5% NaOH solution heated to 50° C., for 30 s, then immersed in a 30% $HNO_3$ solution for 60 s, further washed with city water and ion-exchange water, and thereafter the non-dried sample was measured for pitting potential (reference electrode was a saturated calomel electrode) at room temperature under such conditions in a 2.67% $AlCl_3$ solution at 40° C. in a degassed atmosphere at a potential sweep rate of 0.5 mV/s. The pitting potential was defined as a potential at which the current density upsurges in a current density-potential diagram. In the case where no clear upsurge of the current density was observed, however, the measurement was made by defining a potential of the current density of 0.1 mA/cm$^2$ as the pitting potential. The results are indicated as Epit after brazing.

The case where the pitting potential was less noble than −780 mV was taken as ○. Here, the less noble, the shallower the corrosion depth of the tube becomes.

(Melting Point)

For the prepared fin material, the solidus temperature was measured by a conventional method using DTA (differential thermal analysis). The temperature-rise rate during the measurement time was made to be 20° C./min for from room temperature to 500° C., and 2° C./min for in the range of 500 to 600° C. Alumina was used for the reference.

(Crystal Grain Diameter After Brazing)

The crystal grain diameter after brazing was measured by a stereoscopic microscope. The prepared fin material was subjected to the brazing-equivalent heat treatment, and thereafter immersed in a corrosive liquid in which hydrochloric acid, nitric acid, hydrofluoric acid and pure water were mixed in proportions of 16.4 mL, 15.8 mL, 6.3 mL and 61.5 mL, respectively, for a certain time to be etched until the crystal grain texture of the rolled surface became clearly visible; and thereafter, the crystal grain texture of the rolled surface was observed by a stereoscopic microscope. 20 times was basically employed as the observation magnification, and in the case where the crystal grain is very coarse or fine, the observation magnification was suitably varied according to the size of the crystal grain. The crystal grain texture was photographed for 5 visual fields, and the size of the crystal grain was measured by a sectioning method in the parallel direction to the rolling direction.

Measurement of (the Fe/(Mn+Si) Ratio in the Compound)

The prepared fin material was subjected to the same brazing-equivalent heat treatment as in the above; thereafter, a cross-section parallel to the rolling direction was exposed by a CP work; and individual compounds 0.5 μm or larger as the subject were quantitatively analyzed by particle analysis with EPMA to thereby determine averages of the contents of Mn, Fe and Si in the Al—Mn—Fe—Si compound. Here, the measurement area was made to be 50×50 μm$^2$, and the number of visual fields was suitably selected so that the number of the compound particles to be measured was taken to be 300 or more particles at the least.

The case where the Fe/(Mn+Si) ratio in the compound was 0.25 or lower was taken as ○○; higher than 0.25 and lower than 0.30, as ○; and 0.30 or higher, as X.

(Erosion Property)

By using the prepared fin material and a tube material (sacrificial material: 7072 (15% clad)/core material: 3003/brazing filler metal: 4045 (10% clad)) of 0.2 mm in plate thickness, a mini-core heat exchanger for evaluation of the erosion property was assembled according to the following procedure. First, the fin material was corrugation-worked. Then, the fin material was assembled on the tube material. A flux was applied in an amount of 5 g/m$^2$ on a joining portion of the tube material with the fin material, and the resultant was subjected to a brazing heat treatment. The brazing was carried out under the condition of heating up to 600° C. at an average temperature-rise rate of 40° C./min, holding the temperature at 600° C. for 3 min, and then cooling at a temperature-fall rate of 100° C./min. Arbitrary portions of the fabricated mini-core heat exchanger were embedded in a resin, and the cross-section of the fin/tube joining portion was observed. A fin right near a joining portion fillet was observed and the state of the erosion of the fin was examined.

The case where any buckling was generated on the fin was taken as X; the case where erosion penetrating a half or more and less than the whole of the plate thickness was generated, as ○; and the case where slight erosion of a half or less of the plate thickness was generated, as ○○.

(Sacrificial Anode Effect of the Fin: Corrosion Depth of the Tube)

A mini-core heat exchanger was fabricated by the same method as in (Erosion property). The heat exchanger assembled for the test was subjected to a SWAAT test (according to G85-A of ASTM) for 30 days. The test piece after the test was immersed in a boiled phosphoric acid-chromic acid mixed solution for 10 min to remove corrosion products; and the corrosion states of the fin and the tube were evaluated.

The sacrificial anode effect of the fin was evaluated based on the corrosion depth generated on the tube between the fin; and the case where the corrosion depth of the tube was 20 μm or deeper was taken as X; and shallower than 20 μm, as ○.

(Resistance to Self-corrosion of the Fin)

The resistance to self-corrosion of the fin was determined by embedding the test piece in a resin after the removal of the corrosion products, acquiring cross-sections of 20 arbitrary portions of the fin, and determining (an area in each cross-section where the fin remained)/(an area thereof before the corrosion test). The case where the remaining rate of the fin was 80% or higher was taken as ○○; 50 to 79%, as ○; and lower than 50%, as X.

(Comprehensive Evaluation)

The case where any one test item was X, was evaluated as X.

The case where the pitting potential after brazing was ○, and all the other test items were ○ or better, was evaluated as ○.

The case where the pitting potential after brazing was ○, and all the other test items were ○○, was evaluated as ○○.

TABLE 1

| | Chemical component (%) | | | | | |
|---|---|---|---|---|---|---|
| No. | Mn | Si | Fe | Cu | Zr | Zn |
| 1 | 1.0 | 1.0 | 0.20 | 0.05 | 0.15 | 2.0 |
| 2 | 1.4 | 1.0 | 0.20 | 0.05 | 0.15 | 2.0 |
| 3 | 1.55 | 1.0 | 0.20 | 0.05 | 0.15 | 2.0 |
| 4 | 1.70 | 1.0 | 0.20 | 0.05 | 0.15 | 2.0 |
| 5 | 1.78 | 1.0 | 0.20 | 0.05 | 0.15 | 2.0 |
| 6 | 2.0 | 1.0 | 0.20 | 0.05 | 0.15 | 2.0 |
| 7 | 1.7 | 0.4 | 0.20 | 0.05 | 0.15 | 2.0 |
| 8 | 1.7 | 0.8 | 0.20 | 0.05 | 0.15 | 2.0 |
| 9 | 1.7 | 0.95 | 0.20 | 0.05 | 0.15 | 2.0 |
| 10 | 1.7 | 1.15 | 0.20 | 0.05 | 0.15 | 2.0 |
| 11 | 1.7 | 1.25 | 0.20 | 0.05 | 0.15 | 2.0 |
| 12 | 1.7 | 1.5 | 0.20 | 0.05 | 0.15 | 2.0 |
| 13 | 1.7 | 1.0 | 0.05 | 0.05 | 0.15 | 2.0 |
| 14 | 1.7 | 1.0 | 0.20 | 0.05 | 0.15 | 2.0 |
| 15 | 1.7 | 1.0 | 0.50 | 0.05 | 0.15 | 2.0 |
| 16 | 1.7 | 1.0 | 0.20 | 0.05 | 0.02 | 2.0 |
| 17 | 1.7 | 1.0 | 0.20 | 0.05 | 0.15 | 2.0 |
| 18 | 1.7 | 1.0 | 0.20 | 0.05 | 0.40 | 2.0 |
| 19 | 1.7 | 1.0 | 0.20 | 0.05 | 0.15 | 0.5 |
| 20 | 1.7 | 1.0 | 0.20 | 0.05 | 0.15 | 2.0 |
| 21 | 1.7 | 1.0 | 0.20 | 0.05 | 0.15 | 3.5 |
| 22 | 1.7 | 1.0 | 0.20 | 0.05 | 0.15 | 2.6 |
| 23 | 1.7 | 1.0 | 0.20 | 0.05 | 0.15 | 2.9 |
| 24 | 1.7 | 1.0 | 0.20 | 0.05 | 0.15 | 3.6 |
| 25 | 1.7 | 1.33 | 0.20 | 0.05 | 0.15 | 2.0 |
| 26 | 1.55 | 1.0 | 0.20 | 0.00 | 0.15 | 2.0 |
| 27 | 1.7 | 1.0 | 0.20 | 0.00 | 0.15 | 2.0 |
| 28 | 1.7 | 0.95 | 0.20 | 0.00 | 0.15 | 2.0 |
| 29 | 1.7 | 1.0 | 0.20 | 0.00 | 0.15 | 2.6 |
| 30 | 1.7 | 1.15 | 0.20 | 0.00 | 0.15 | 2.0 |

TABLE 1

| No. | | Component | Casting rate (° C./Sec.) | Homogenizing treatment (° C. × time) | Material compound (Pieces/ μm2) | TS after brazing x less than 135 MPa ○135-139 MPa ○○140 MPa or more | Epit after brazing x - noble than −780 mV ○ - less noble than −780 mV | Melting point x - less than 615° C. ○615-619° C. ○○620° C. or more | Crystal grain diameter after brazing (μm) | Fe/(Mn + Si) into the compound | Brazing erosion property x buckling ○slight erosion ○○no erosion | Sacrificial anode effect (corrosion depth of the tube) x 20 or more ○less than 20 | Resistance to self-corrosion | Overall evaluation x: Either is x ○: All ○ or more ○○: All ○○ or more |
|---|---|---|---|---|---|---|---|---|---|---|---|---|---|---|
| Comparative Example | 1 | 1 | 2° C./s | 450° C. × 10 h | 40 | 123x | −810○ | 619○ | 700 | 0.28○ | ○ | 12○ | x | x |
| Inventive example | 2 | 2 | 2° C./s | 450° C. × 10 h | 40 | 135○ | −806○ | 623○○ | 700 | 0.27○ | ○○ | 15○ | ○ | ○ |
| | 3 | 3 | 2° C./s | 450° C. × 10 h | 40 | 140○○ | −804○ | 624○○ | 700 | 0.20○○ | ○○ | 15○ | ○○ | ○○ |
| | 4 | 4 | 2° C./s | 450° C. × 10 h | 40 | 144○○ | −803○ | 624○○ | 700 | 0.19○○ | ○○ | 15○ | ○○ | ○○ |
| | 5 | 5 | 2° C./s | 450° C. × 10 h | 40 | 139○ | −802○ | 624○○ | 700 | 0.19○○ | ○○ | 15○ | ○○ | ○ |
| Comparative Example | 6 | 6 | 2° C./s | 450° C. × 10 h | 40 | 136○ | −800○ | 624○○ | 700 | 0.17○○ | ○○ | 15○ | ○○ | x Huge intermetallic compound |
| | 7 | 7 | 2° C./s | 450° C. × 10 h | 40 | 120x | −775x | 634○○ | 700 | 0.35x | ○○ | 40x | x | x |
| Inventive example | 8 | 8 | 2° C./s | 450° C. × 10 h | 40 | 136○ | −800○ | 633○○ | 700 | 0.29○ | ○○ | 15○ | ○ | ○ |
| | 9 | 9 | 2° C./s | 450° C. × 10 h | 40 | 142○○ | −802○ | 628○○ | 700 | 0.20○○ | ○○ | 15○ | ○○ | ○○ |
| | 10 | 10 | 2° C./s | 450° C. × 10 h | 40 | 150○○ | −805○ | 620○○ | 700 | 0.18○○ | ○○ | 15○ | ○○ | ○○ |
| | 11 | 11 | 2° C./s | 450° C. × 10 h | 40 | 154○○ | −807○ | 616○ | 700 | 0.18○○ | ○○ | 15○ | ○○ | ○ |
| Comparative Example | 12 | 12 | 2° C./s | 450° C. × 10 h | 40 | 164○○ | −810○ | 601x | 700 | 0.16○○ | x | 13○ | ○○ | x |
| | 13 | 13 | 2° C./s | 450° C. × 10 h | 40 | 141○○ | −803○ | 626○○ | 700 | 0.14○○ | ○○ | 15○ | ○ | x Cost |
| Inventive example | 14 | 14 | 2° C./s | 450° C. × 10 h | 40 | 144○○ | −803○ | 626○○ | 700 | 0.19○○ | ○○ | 15○ | ○ | ○ |
| Comparative Example | 15 | 15 | 2° C./s | 450° C. × 10 h | 40 | 150○○ | −803○ | 626○○ | 700 | 0.45○○ | ○○ | 15○ | x | x Huge intermetallic compound |
| | 16 | 16 | 2° C./s | 450° C. × 10 h | 40 | 141○○ | −803○ | 626○○ | 100 | 0.19○○ | x | 15○ | ○○ | x |
| Inventive example | 17 | 17 | 2° C./s | 450° C. × 10 h | 40 | 144○○ | −803○ | 626○○ | 700 | 0.19○○ | ○○ | 15○ | ○○ | ○○ |
| Comparative Example | 18 | 18 | 2° C./s | 450° C. × 10 h | 40 | 145○○ | −803○ | 626○○ | 1100 | 0.19○○ | ○○ | 15○ | ○○ | x Huge intermetallic compound |
| | 19 | 19 | 2° C./s | 450° C. × 10 h | 40 | 144○○ | −728○ | 633○○ | 700 | 0.19○○ | ○○ | 70x | ○○ | x |
| Inventive example | 20 | 20 | 2° C./s | 450° C. × 10 h | 40 | 144○○ | −803○ | 626○○ | 700 | 0.19○○ | ○○ | 15○ | ○○ | ○ |
| Comparative Example | 21 | 21 | 2° C./s | 450° C. × 10 h | 40 | 144○○ | −878○ | 618○ | 700 | 0.19○○ | ○ | 6○ | x | x |
| Inventive example | 22 | 22 | 2° C./s | 450° C. × 10 h | 40 | 144○○ | −843○ | 622○○ | 700 | 0.19○○ | ○○ | 9○ | ○○ | ○○ |
| | 23 | 23 | 2° C./s | 450° C. × 10 h | 40 | 144○○ | −873○ | 621○○ | 700 | 0.19○○ | ○○ | 5○ | ○○ | ○○ |
| Comparative Example | 24 | 24 | 2° C./s | 450° C. × 10 h | 40 | 144○○ | −940○ | 620○○ | 700 | 0.19○○ | ○○ | 2○ | x | x |
| Inventive example | 25 | 2 | 2° C./s | 450° C. × 10 h | 40 | 135○ | −806○ | 623○○ | 700 | 0.27○○ | ○○ | 15○ | ○ | ○ |
| | 26 | 2 | 2° C./s | 500° C. × 10 h | 35 | 135○ | −806○ | 623○○ | 500 | 0.22○○ | ○○ | 15○ | ○○ | ○ |
| | 27 | 8 | 2° C./s | 450° C. × 10 h | 40 | 136○ | −800○ | 633○○ | 700 | 0.29○○ | ○○ | 15○ | ○ | ○ |
| | 28 | 8 | 2° C./s | 520° C. × 5 h | 33 | 136○ | −800○ | 633○○ | 550 | 0.21○○ | ○○ | 15○ | ○○ | ○ |
| | 29 | 3 | 2° C./s | 450° C. × 10 h | 40 | 140○○ | −804○ | 624○○ | 700 | 0.20○○ | ○○ | 15○ | ○○ | ○○ |

TABLE 1-continued

| No. | | Component | Casting rate (° C./Sec.) | Homogenizing treatment (° C. × time) | Material compound (Pieces/ μm2) | TS after brazing x less than 135 MPa ○135-139 MPa ○○140 MPa or more | Epit after brazing x - noble than −780 mV ○ - less noble than −780 mV | Melting point x - less than 615° C. ○615-619° C. ○○620° C. or more | Crystal grain diameter after brazing (μm) | Fe/(Mn + Si) into the compound | Brazing erosion property x buckling ○slight erosion ○○no erosion | Sacrificial anode effect (corrosion depth of the tube) x 20 or more ○less than 20 | Resistance to self-corrosion | Overall evaluation x: Either is x ○: All ○ or more ○○: All ○○ or more |
|---|---|---|---|---|---|---|---|---|---|---|---|---|---|---|
| Comparative | 30 | 3 | 2° C./s | 600° C. × 10 h | 3 | 142○○ | −804○ | 624○○ | 50 | 0.20○○ | x | 15○ | ○○ | x |
| Example | 31 | 25 | 2° C./s | 450° C. × 10 h | 40 | 156○○ | −807○ | 613x | 700 | 0.17○○ | x | 15○ | ○○ | x |
| Inventive example | 32 | 3 | 2° C./s | 400° C. × 10 h | 40 | 140○○ | −804○ | 624○○ | 950 | 0.20○○ | ○○ | 15○ | ○○ | ○○ |
| Comparative Example | 33 | 3 | 2° C./s | 330° C. × 20 h | 90 | 134x | −804○ | 624○○ | 1500 | 0.25○○ | ○○ | 15○ | ○○ | x |
| Inventive | 34 | 26 | 2° C./s | 450° C. × 10 h | 40 | 136○ | −847○ | 626○○ | 610 | 0.20○○ | ○○ | 17○ | ○○ | ○ |
| example | 35 | 27 | 2° C./s | 450° C. × 10 h | 40 | 139○ | −844○ | 627○○ | 600 | 0.19○○ | ○○ | 18○ | ○○ | ○ |
| | 36 | 28 | 2° C./s | 450° C. × 10 h | 40 | 138○ | −842○ | 629○○ | 590 | 0.20○○ | ○○ | 16○ | ○○ | ○ |
| | 37 | 29 | 2° C./s | 450° C. × 10 h | 40 | 139○ | −873○ | 624○○ | 620 | 0.19○○ | ○○ | 9○ | ○○ | ○ |
| | 38 | 30 | 2° C./s | 450° C. × 10 h | 40 | 146○○ | −845○ | 623○○ | 600 | 0.18○○ | ○○ | 15○ | ○○ | ○○ |
| | 39 | 4 | 15° C./s | 450° C. × 10 h | 40 | 146○○ | −803○ | 624○○ | 700 | 0.26○ | ○○ | 15○ | ○○ | ○ |
| | 40 | 4 | 0.6° C./s | 450° C. × 10 h | 40 | 144○○ | −803○ | 624○○ | 700 | 0.19○○ | ○○ | 15○ | ○○ | ○○ |
| | 41 | 4 | 1° C./s | 450° C. × 10 h | 40 | 144○○ | −803○ | 624○○ | 700 | 0.19○○ | ○○ | 15○ | ○○ | ○○ |
| | 42 | 4 | 5° C./s | 450° C. × 10 h | 40 | 144○○ | −803○ | 624○○ | 700 | 0.20○○ | ○○ | 15○ | ○○ | ○○ |
| | 43 | 4 | 13° C./s | 450° C. × 10 h | 40 | 144○○ | −803○ | 624○○ | 700 | 0.23○○ | ○○ | 15○ | ○○ | ○○ |
| | 44 | 4 | 25° C./s | 450° C. × 10 h | 40 | 144○○ | −803○ | 624○○ | 700 | 0.29○ | ○○ | 15○ | ○○ | ○○ |

EXPLANATION OF REFERENCES LETTERS

1 ALUMINUM ALLOY FIN MATERIAL
2 TUBE
10 HEAT EXCHANGER

The invention claimed is:

1. An aluminum alloy fin material, wherein the aluminum alloy fin material has a composition, in % by mass, of the following: Zr: 0.05 to 0.25%, Mn: 1.3 to 1.8%, Si: 0.7 to 1.3%, Fe: 0.10 to 0.35%, and Zn: 1.2 to 3.0%, the remainder being Al and inevitable impurities, and wherein the aluminum alloy fin material has a solidus temperature of 615° C. or higher, a tensile strength after brazing of 135 MPa or higher, a pitting potential after brazing in the range of −900 to −780 mV, and an average crystal grain diameter in a rolled surface after brazing in the range of 200 μm to 1,000 μm.

2. The aluminum alloy fin material according to claim 1, further comprising, in % by mass, Cu: 0.03 to 0.10%, as compositional component.

3. The aluminum alloy fin material according to claim 2, wherein among second-phase particles distributed in a matrix thereof after brazing, averages of the contents of Mn, Fe and Si in an Al—Mn—Fe—Si compound 0.5 μm or larger in circle-equivalent diameter satisfy a relation of Fe/(Mn+Si)<0.25 by atomic % in compound.

4. The aluminum alloy fin material according to claim 3, wherein in a raw material before working thereof, second-phase particles distributed in a matrix thereof in the range of 0.05 to 0.4 μm in circle-equivalent diameter are present in the range of 20 to 80 particles/$\mu m^2$.

5. The aluminum alloy fin material according to claim 2, wherein in a raw material before working thereof, second-phase particles distributed in a matrix thereof in the range of 0.05 to 0.4 μm in circle-equivalent diameter are present in the range of 20 to 80 particles/$\mu m^2$.

6. The aluminum alloy fin material according to claim 1, wherein among second-phase particles distributed in a matrix thereof after brazing, averages of the contents of Mn, Fe and Si in an Al—Mn—Fe—Si compound 0.5 μm or larger in circle-equivalent diameter satisfy a relation of Fe/(Mn+Si)<0.25 by atomic % in compound.

7. The aluminum alloy fin material according to claim 6, wherein in a raw material before working thereof, second-phase particles distributed in a matrix thereof in the range of 0.05 to 0.4 μm in circle-equivalent diameter are present in the range of 20 to 80 particles/$\mu m^2$.

8. The aluminum alloy fin material according to claim 1, wherein in a raw material before working thereof, second-phase particles distributed in a matrix thereof in the range of 0.05 to 0.4 μm in circle-equivalent diameter are present in the range of 20 to 80 particles/$\mu m^2$.

9. A heat exchanger comprising the aluminum alloy fin material according to claim 1.

* * * * *